July 12, 1927. J. P. BETHKE Re. 16,673

ELECTROMAGNETIC APRON FEEDER

2 Sheets-Sheet 1

Original Filed March 24, 1923

INVENTOR.
John P. Bethke
BY
Erwin Wheeler & Woolard
ATTORNEYS

July 12, 1927.

J. P. BETHKE

ELECTROMAGNETIC APRON FEEDER

Re. 16,673

Original Filed March 24, 1923

2 Sheets-Sheet 2

INVENTOR.
John P. Bethke
BY Erwin A. Ruler & Woolard
ATTORNEYS

Reissued July 12, 1927. Re. 16,673

UNITED STATES PATENT OFFICE.

JOHN P. BETHKE, OF MILWAUKEE, WISCONSIN, ASSIGNOR TO MAGNETIC MANUFACTURING CO., OF MILWAUKEE, WISCONSIN.

ELECTROMAGNETIC APRON FEEDER.

Original No. 1,531,372, dated March 31, 1925, Serial No. 627,297, filed March 24, 1923. Application for reissue filed March 25, 1927. Serial No. 178,493.

This invention relates to improvements in apron feeders of the general type employed for feeding rock, ore, and other materials to crushing mills.

The object of this invention is to provide an apron feeder with effective means for separating magnetizable material from the material to be crushed, thereby protecting the crushing mills by removing the harder portions of the material, including fragments of iron and steel broken or disengaged from the machinery employed in handling such materials.

A further object of this invention is to so combine a magnet with an apron feeder as to convert the feeder into an effective magnetic separator without radical change in structure or design.

A more detailed object is the utilizing of minimum driving power and magnetic energy for attaining maximum efficiency both in the operation of the apron and in energizing the magnetic field exciter while employing wear-resisting metal in the apron construction, the arrangement and operation of the parts being such as to insure minimum interference of the apron with the effectiveness of the magnetic field and of the field with the operation of the apron.

In the drawings.

Like parts are identified by the same reference characters throughout the several views.

Figure 1:
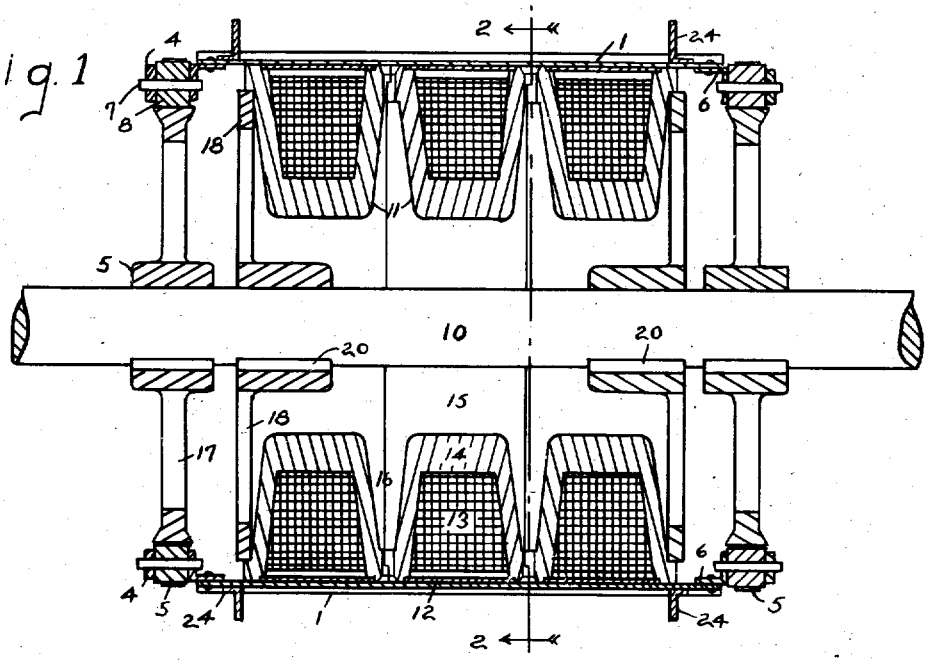
Figure 1 is a sectional view of an apron feeder embodying the invention herein claimed, the section being taken on a vertical plane which includes the axis of the sprocket shaft at the delivery end of the feeder.
Figure 2:
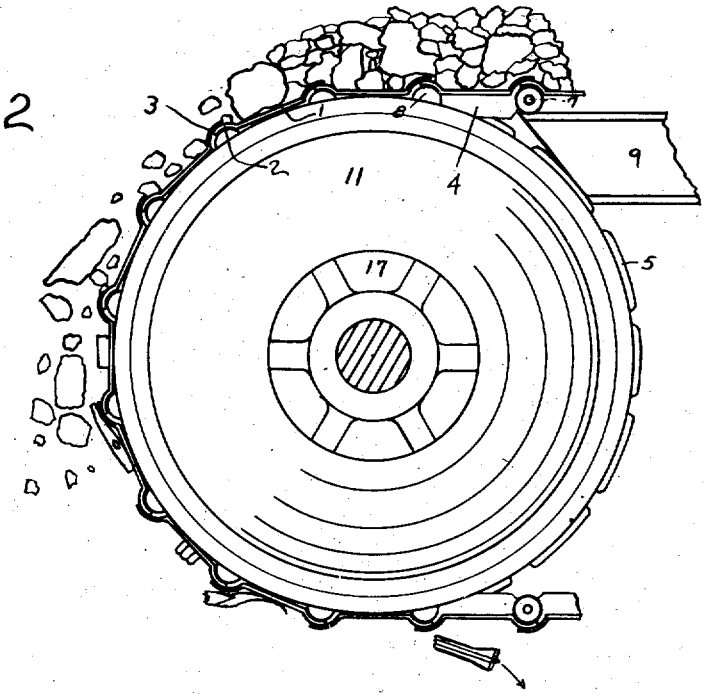
Figure 2 is a sectional view on line 2—2 of Figure 1.

In Figures 1 and 2 the apron is of ordinary type and comprises a succession of flat plates or bars 1 having cylindrically curved or arcuate margins 2 and 3 which interlap with the margins of adjacent bars to form an endless belt. At their respective ends the plates 1 are supported by sprocket chains 4 which travel about end sprocket wheels 5, the connection between the plates and the sprocket chains being made substantially along the longitudinal center line of the plates. The links of the sprocket chains have their central portions provided with arms 6 for this purpose. But the connecting pins 7 of the links are provided with rollers 8 which travel along supporting beams 9. The spaces between the teeth of the sprocket wheels are adapted to receive the rollers 8. The margins 2 and 3 of the apron plates are curved about the axes of the pins 7.

At the delivery end of the conveyor the sprocket wheels 5 are mounted upon a shaft 10 which may serve as the driving shaft, and between these sprocket wheels an electromagnetic pulley 11 is mounted on the same shaft and has a diameter substantially equal to that of the pitch circle of the sprocket wheels, whereby the periphery of the pulley is brought into close proximity to the plates 1 as they pass about the shaft 10 without necessarily being in actual contact with the plates.

The pulley may be of the type disclosed in Letters Patent of the United States to John P. Bethke, No. 1,334,177, dated July 12, 1921, or to John P. Bethke and R. H. Stearns, No. 1,407,051, dated February 21, 1922. Magnetic pulleys in which the windings are protected by sleeves or coverings 12, composed of non-magnetic material, are preferably employed since the apron is composed of magnetizable material, i. e., steel, which provides a distribution of the lines of magnetic force similar to that described in the above mentioned Patent No. 1,407,051.

In a pulley having a diameter of about 18 inches the pole pieces have a thickness of about two inches, which is about eight times the thickness of the steel apron. Therefore, a small percentage of the lines of magnetic force will saturate the apron and the latter becomes magnetic over substantially the entire area of that portion in proximity to the pulley without reducing the effective strength of the field beyond the apron. The abutting ends of the spools, composing the magnetic pulley, constitute annular pole pieces, and the spools are so wound that the successive pole pieces will be of opposite polarity.

It will be observed that the exciting windings 13 of the magnetic pulley are wholly protected by the spools 14 and the coverings 12, but that the pulley is well ventilated, the spools being spaced from the shaft and from each other to form an annular ventilating passage 15 and cavities 16 extending between the spools. The sprocket wheels are of skeleton formation with openings 17 to allow free circulation of air through the pulley. These sprocket wheels also carry the load of the apron and the material thereon, thereby relieving the magnetic pulley from strain and making it possible to wholly support the spools from the skeleton end walls 18 of the pulley. The pulley, however, is preferably splined at 20 to the shaft 10, whereby friction is avoided if any portion of the apron should come in contact with its periphery. This makes it possible to bring the pulley into extremely close proximity to the apron, i. e., into substantial contact with it without subjecting the pulley to material pressure and without developing friction if actual contact results.

The operation of apron feeders is slow and it is customary to feed material to the apron in irregular masses or piles, thus forming upon the apron a layer of material of varying thickness, and frequently of a thickness or depth of one foot or more. But notwithstanding the thickness of this layer which would ordinarily make magnetic separation difficult, if not impossible, it has been found that the invention above described can be utilized owing to the cascading of the material across the delivery end of the conveyor, i. e., over the magnetic pulley, whereby the material forms a thin layer over the surface of the pulley along that portion of the apron extending downwardly from a vertical plane through the axis of the pulley to a horizontal plane which includes such axis. The material not only cascades in the form of a thin layer but the component parts of the layer also separate longitudinally as the motion of the falling bodies accelerates. It is, therefore, possible to provide the apron feeder with stationary side walls or guards 24 to allow the material to accumulate on the apron to a considerable depth throughout the width of the apron.

Figure 3:
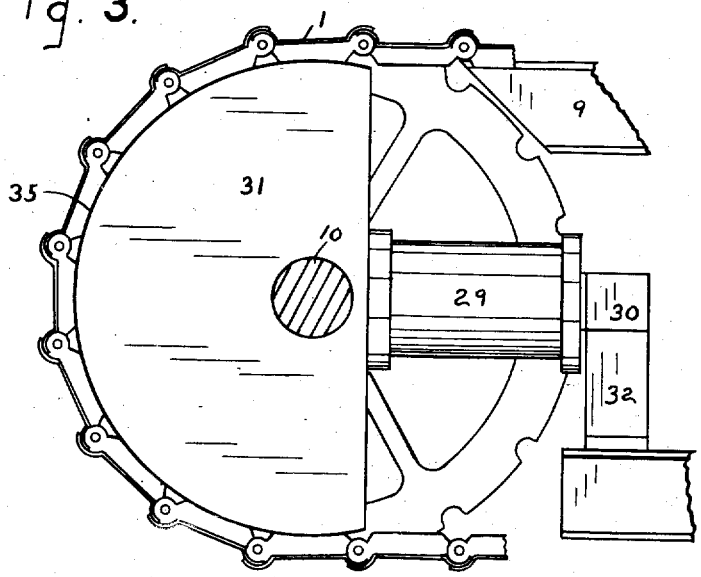
Figure 3 is a view similar to Figure 2, showing an embodiment of the invention in which a stationary magnet is utilized.
Figure 4:
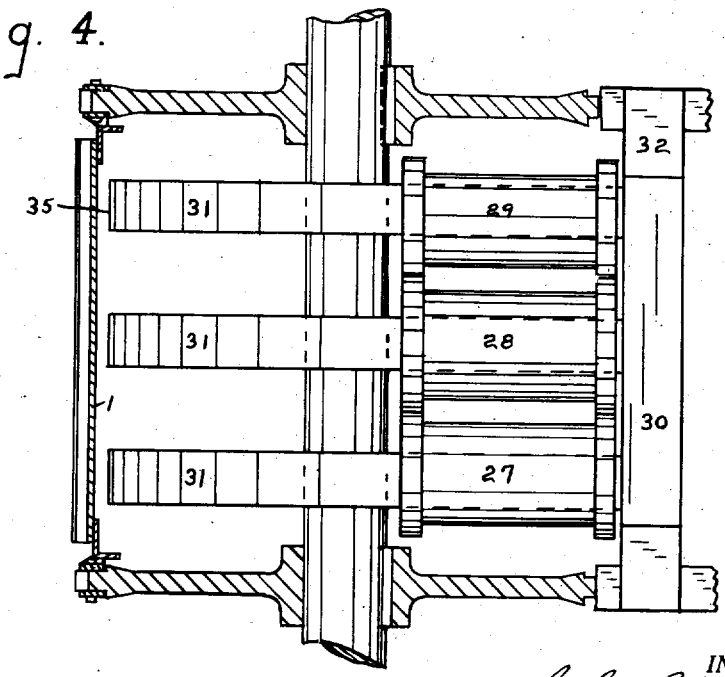
Figure 4 is a plan view of the magnet or electro-magnetic battery shown in Figure 3.

Referring now to Figures 3 and 4, it will be observed that in place of the magnetic pulley disclosed in Figures 1 and 2, I may employ a battery of electromagnetic spools 27, 28, and 29 connected by a yoke 30. Each spool has its core provided with an extended segmental pole piece 31, and the successive spools in the set or battery are oppositely wound, the pole pieces being thereby of opposite polarity. The shaft 10 of the apron conveyor extends through apertures in these pole pieces 31, whereby the shaft co-operates with a non-magnetic bar 32 in supporting the battery of magnets. The yoke 30 rests upon the bar 32 as shown.

The curved surfaces 35 of the pole pieces 31 lie in an arc concentric with the shaft 10 and in close proximity to the apron. In this construction it is, of course, desirable to prevent contact between the members or plates 1, composing the apron and the pole pieces. Therefore, the magnetic pulley disclosed in Figures 1 and 2 is preferred. It is also preferred for the reason that its structure provided for a more effective distribution of magnetic energy for the reasons above stated.

While I have described the apron sections 1 as being formed of steel, it will be understood that any rigid material suitable for feeding heavy masses of rock or ore may be employed. Steel is preferably used for the reason above stated, i. e., that it becomes magnetic in the vicinity of the pulley, and, therefore, more effective in holding magnetizable material. It also distributes the lines of magnetic force whereby magnetizable material midway between the pole pieces may be attracted directly toward the apron along a line substantially perpendicular to its surface.

Because of difficulties incident to a path of low reluctance presented by a conveyor of magnetizable material, rubber, leather, canvas and other fabric have been proposed but no substantial commercial success has followed their use, largely because of lack of permanency and stability; whereas, with the present invention, the conveyor apron of metal, usually but not necessarily magnetizable, passes through the magnetic field in such a way as to afford a substantial and sufficient field beyond the exposed face of the apron to effectively separate the magnetizable from the non-magnetizable material of the load. Rotation of the magnetic pulley causes the magnetic field to travel with the load and apron, and, where an apron of magnetizable material is used, the accelerating pull on the apron approaching the magnet is substantially equalized by the resistance to departure of the return reach of the apron; so that a comparatively small resistance for a device of this kind is offered to the travel of the apron past the magnet. Thus also relatively little current is required for effectively energizing the magnet, and a corresponding minimum of power used for driving the apron, so that relatively small expense is involved in operation and in original construction. Easily worn parts, multiplicity of magnets, wasteful distribution of magnetic fields, and high power requirements, have and will inevitably result in commercial failures. The present invention avoids all such, and enables attainment of maximum results with a minimum outlay.

I claim:

1. An apron feeder having an endless conveyor apron composed of a flexibly formed belt of substantially rigid sections of magnetizable material, in combination with a magnet, the field of which includes the delivery end of the conveyor.

2. An apron feeder having an endless conveyor apron comprising load-carrying, flexibly connected, substantially rigid sections of magnetizable material, in combination with a rotary magnet, the field of which includes the delivery end of the conveyor.

3. The combination of an apron feeder having a conveyor apron composed of flexibly connected metallic sections, and a rotary magnet, the field of which includes the delivery end of the conveyor.

4. The combination of an apron feeder having a magnetizable load engaging and load-conveyor belt, and a revolving magnet located to have its field influence the load through the belt.

5. The combination of an apron feeder having a conveyor apron composed of lapping metallic sections, and a rotary magnet located to have its field influence the load of the apron.

6. An apron feeder having an endless, metallic load-conveyor apron comprising flexibly connected sections, in combination with a magnet mounted for having its field move with the load at one place in the travel of the apron for influencing magnetizable content of such load.

7. An apron feeder having an endless metallic conveyor apron comprising a load carrying reach and a return reach with bights between the reaches, in combination with a revolving magnet mounted between the reaches.

8. An apron feeder having an endless metallic conveyor apron comprising a load carrying reach and a return reach with bights between the reaches, in combination with a magnet revolvably mounted in the bight of the apron to have its field travel with the load.

9. An apron feeder having an endless conveyor apron composed of flexibly connected metallic sections, in combination with supporting wheels for said sections, and an electromagnetic pulley interposed between the wheels at the delivery end of the apron with its periphery in close proximity to the apron.

10. An apron feeder having an endless conveyor apron, in combination with supporting wheels for said apron, and an electromagnetic pulley interposed between the wheels at the delivery end of the apron with its periphery in close proximity to the apron, said pulley having annular pole pieces of successively opposite polarity, said supporting wheels being adapted to support the conveyor apron independently of said pulley, whereby to relieve said pulley from the weight of material being carried by said apron.

11. The combination with an electromagnet having pole pieces of opposite polarity, of a feeding apron having supporting wheels for supporting said apron independently of said pole pieces to revolve at its delivery end about said pole pieces, each pole piece having a curved face substantially in an arc concentric with that along which the apron travels.

12. The combination with an electromagnetic pulley having annular pole pieces of successively opposite polarity, and a feeding apron having supporting wheels supporting said apron independently of said pole pieces to travel at its delivery end about the axis of the pulley.

13. The combination with an electromagnetic pulley having anular pole pieces of successively opposite polarity, a feeding apron independently supported to travel at its delivery end about the axis of the pulley, and means for ventilating the pulley.

14. The combination with an electromagnetic pulley having a series of annular magnetic windings and intervening pole pieces of opposite polarity, and a covering for the windings composed of magnetizable material, of an apron feeder comprising a series of flexibly joined magnetizable members, means for supporting said feeder for travel about the pulley in close proximity thereto, said supporting means being adapted to relieve the pulley from weight.

15. The combination with an electromagnetic pulley having annular pole pieces of opposite polarity, and intervening spacers of magnetizable material, forming, with the pole pieces, a continuous cylinder, of an endless conveyor apron arranged to travel over said pulley apron, supporting wheels at each end of the pulley, and a common actuating means for the wheels and pulley.

16. An apron feeder having an endless conveyor comprising magnetizable plates hingedly secured together, in combination with supporting wheels for said conveyor, and an electro-magnetic pulley interposed between the wheels at the delivery end of the conveyor, said plates being supported in their travel about the pulley in close proximity thereto.

17. The combination of an apron feeder having an endless conveyor comprising magnetizable plates each having arcuate margins transversely of the conveyor and interlapped with the margins of adjacent plates, said plates being each hingedly secured to its adjacent plates, and an electro-magnetic pulley at the delivery end of the conveyor.

In testimony whereof, I have hereunto signed my name to this specification.

JOHN P. BETHKE.